US007107887B2

(12) United States Patent
Whited

(10) Patent No.: US 7,107,887 B2
(45) Date of Patent: Sep. 19, 2006

(54) ROTARY KNIFE HAVING VACUUM ATTACHMENT

(75) Inventor: Jeffrey A. Whited, Amherst, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 24 days.

(21) Appl. No.: 11/026,854

(22) Filed: Dec. 30, 2004

(65) Prior Publication Data

US 2005/0115082 A1 Jun. 2, 2005

Related U.S. Application Data

(62) Division of application No. 10/289,635, filed on Nov. 7, 2002, now Pat. No. 6,857,191.

(51) Int. Cl.
*B26D 1/00* (2006.01)
*A22C 17/04* (2006.01)

(52) U.S. Cl. ............................ 83/13; 30/123; 30/276; 452/133

(58) Field of Classification Search .................... 83/13, 83/665, 666, 676, 675; 30/123, 276, 347, 30/286, 240, 316, 124, 389, 390, 340; 452/133, 452/132, 137, 149, 164; 384/276, 275
See application file for complete search history.

(56) References Cited

U.S. PATENT DOCUMENTS 3,214,869 A 11/1965 Stryker
4,170,063 A 10/1979 Bettcher
4,198,750 A 4/1980 Bettcher
4,236,531 A 12/1980 McCullough
4,363,170 A 12/1982 McCullough
4,422,239 A 12/1983 Maier et al.
4,439,924 A 4/1984 Bettcher
4,509,261 A 4/1985 Bettcher
4,516,323 A 5/1985 Bettcher
5,230,154 A * 7/1993 Decker et al. ................ 30/276
5,377,411 A 1/1995 Andriotis
5,529,532 A 6/1996 Desrosiers
5,588,289 A * 12/1996 Wilson ....................... 56/13.1
5,664,332 A * 9/1997 Whited et al. ................ 30/276
5,680,704 A 10/1997 Okubo et al.
5,862,595 A * 1/1999 Keane ......................... 30/124
5,924,202 A 7/1999 Romani (Continued)

FOREIGN PATENT DOCUMENTS

DE 295 12 854 U 11/1994

(Continued)

*Primary Examiner*—Kenneth E. Peterson
*Assistant Examiner*—Ghassem Alie
(74) *Attorney, Agent, or Firm*—Watts Hoffmann Co., L.P.A.

(57) ABSTRACT

A rotary knife having a ring blade that defines a closed loop cutting surface for cutting material which the ring blade contacts during rotation. Materials cut using the blade such as meat cut from a carcass or trimmed from a piece of meat are suctioned away from the blade. The material is drawn into a blade housing which supports the ring blade. A housing body has a wall that defines a housing interior into which material separated by the cutting surface of the ring blade moves as it is cut. The blade housing body defines a bearing surface that is defined by a wall of the housing body that supports the ring blade and allows the ring blade to rotate with respect to the blade housing. Alternate coupling designed of the housing body allow the blade housing to be coupled to a suction tube for withdrawing meat from the interior of the blade housing.

8 Claims, 7 Drawing Sheets

U.S. PATENT DOCUMENTS

| | | | | |
|---|---|---|---|---|
| 6,105,253 | A | 8/2000 | Kolbert | |
| 6,219,922 | B1 | 4/2001 | Campbell et al. | |
| 6,223,637 | B1 * | 5/2001 | Hansen | 83/24 |
| 6,233,831 | B1 | 5/2001 | Iida et al. | |
| 6,604,288 | B1 * | 8/2003 | Whited et al. | 30/276 |
| 6,655,033 | B1 | 12/2003 | Herrmann et al. | |
| 6,751,871 | B1 * | 6/2004 | Furnish | 30/276 |
| 6,769,184 | B1 * | 8/2004 | Whited | 30/276 |
| 2002/0108255 | A1 | 8/2002 | Degregorio | |
| 2002/0166245 | A1 * | 11/2002 | Williams | 30/388 |

FOREIGN PATENT DOCUMENTS

| | | | |
|---|---|---|---|
| DE | 29512854 | U1 | 11/1995 |
| DE | 10217195 | C1 | 10/2003 |
| EP | 1 226 907 | A2 | 7/2002 |

* cited by examiner

ROTARY KNIFE HAVING VACUUM ATTACHMENT

CROSS REFERENCE TO RELATED APPLICATION

This application is a divisional of U.S. application Ser. No. 10/289,635, filed on Nov. 7, 2002, now issued as U.S. Pat. No. 6,857,191.

FIELD OF THE INVENTION

The present invention concerns a rotary knife having a ring blade supported by a blade housing. An attachment to the blade housing provides a suction to the housing interior to remove material from the vicinity of the blade as the blade cuts the material from a product.

BACKGROUND ART

U.S. Pat. No. 4,170,063 to Bettcher discloses a knife having a removable blade. This patent is assigned to Bettcher Industries, the assignee of the present invention. The '063 patent discloses a hand knife having a ring-like rotary blade that is rotated by a motor in a handle that extends normal to an axis of rotation of the blade. The blade of the knife is rotatably supported in a housing that surrounds a part of the blade. The blade can be removed for sharpening or replacement of the blade. Other representative United States patents relating to rotary knives that are assigned to the assignee of the present invention are U.S. Pat. Nos. 4,439,924, 4,516,323, and 4,509,261.

Published German Utility Model DE 295 12 854 U1 entitled "Rotating Cutter with Suction Removal for meat or fat" concerns a rotary knife. Meat parts that have been cut from meat are removed by a suction apparatus. The disclosed suction removal apparatus exhibits a tubular connecting piece, one end of which exhibits an outside diameter that essentially corresponds to the inside diameter of a ring-shaped blade housing and a second end of which is configured for connection of a hose.

As depicted in FIG. 2 of this German Utility Model a connecting piece is coupled to a blade housing to provide a connection between the blade housing and a hose coupled to a connecting container. The connecting piece is fastened in the blade housing by means of two screws. The connecting piece exhibits slots through which the screws pass. The screws are loosened somewhat so that the connecting piece is no longer clamped by the screws and can then be separated from an outlet opening of the blade housing.

SUMMARY OF THE INVENTION

The invention concerns a rotary knife having a ring blade that defines a closed loop cutting surface for cutting material which the ring blade contacts during rotation. Materials cut using the blade such as meat cut from a carcass or trimmed from a piece of meat are suctioned away from the blade.

The material is drawn through the ring blade into a blade housing which supports the ring bade. A housing body has a wall that defines a housing interior into which material separated by the cutting surface of the ring blade moves as it is cut. The blade housing body defines a bearing surface that is defined by a wall of the housing body that supports the ring blade and allows the ring blade to rotate with respect to the blade housing.

In an exemplary embodiment of the invention, a notch in a body wall in a region of the bearing surface allows the bearing surface to move for separating the ring blade from the blade housing. A wall portion of the blade housing body that is spaced from the bearing surface includes a coupling for engaging a suction tube that withdraws material from the housing interior.

Alternate exemplary embodiments of the invention are described with a degree of particularity in conjunction with the accompanying drawings.

EXEMPLARY EMBODIMENTS FOR PRACTICING THE INVENTION

Figure 1:
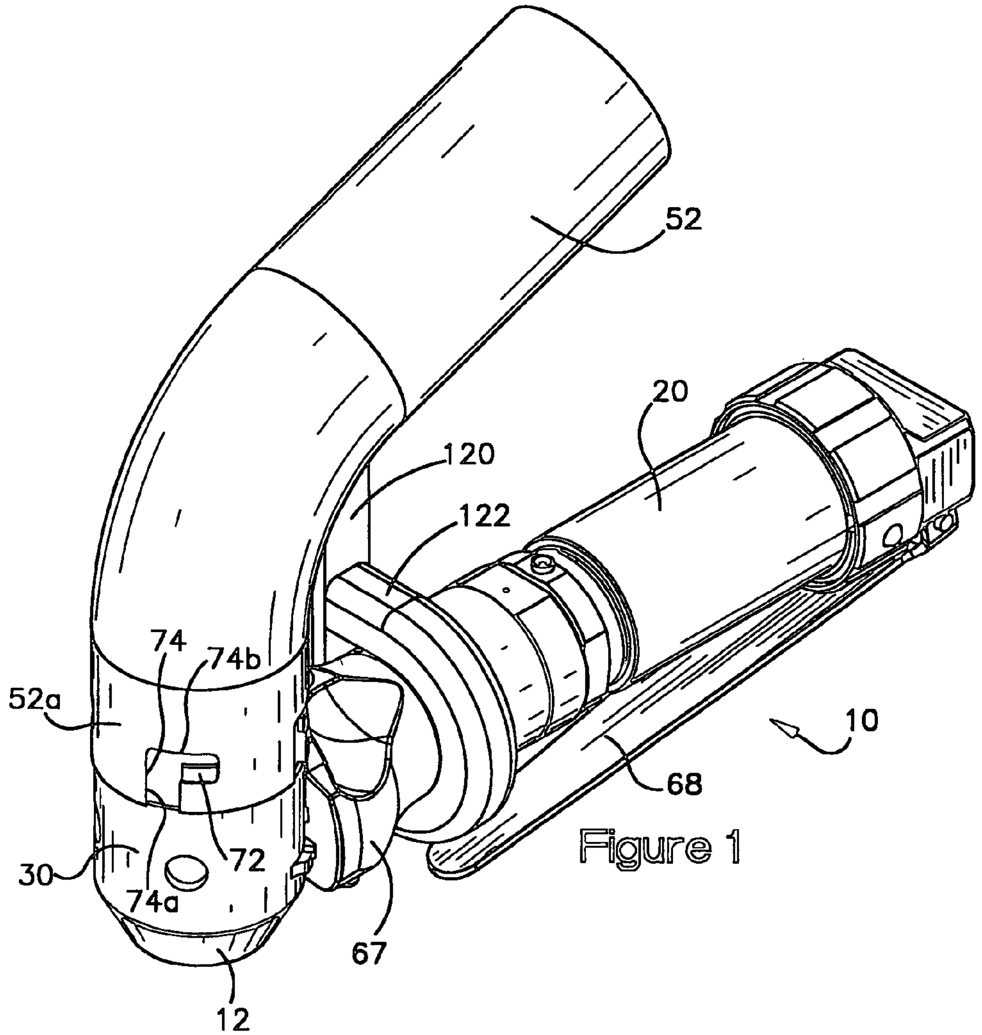
FIG. 1 is a perspective view of a rotary cutting knife constructed in accordance with an exemplary embodiment of the invention.
Figure 2:
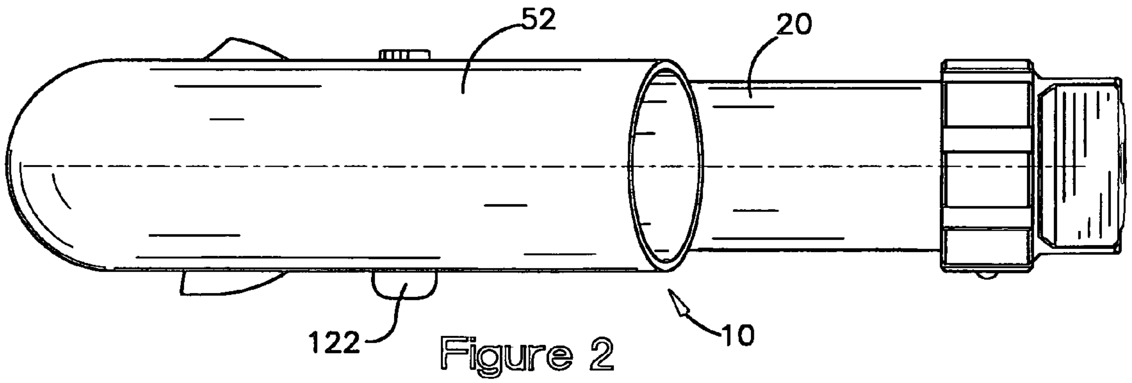
FIG. 2 is a top plan view of the FIG. 1 rotary cutting knife.

FIGS. 1 and 2 depict a rotary knife 10 that includes a ring blade 12 that defines a closed loop cutting surface 14 (FIG. 9) for cutting material which the ring blade contacts during rotation of the ring blade 12. In accordance with one use of the rotary knife, the blade 12 separates a spinal cord from the carcass of an animal after the animal has been slaughtered. Another application of the rotary knife is to clean meat or fat from an animal that has been partially processed using other knives. In this application, the meat that is removed is collected and processed into a consumable meat product.

Figure 3:
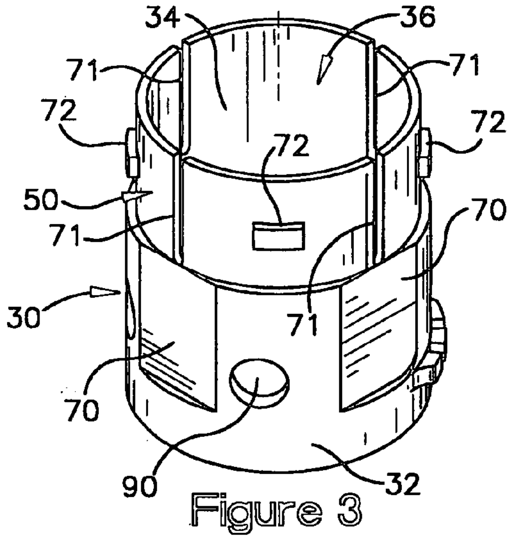
FIG. 3 is a perspective view of one embodiment of a ring blade housing constructed in accordance with the invention.
Figure 4:
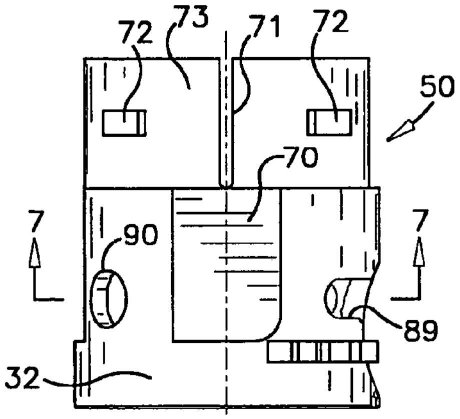
FIG. 4 is a side elevation view of the FIG. 3 ring blade housing.
Figure 5:
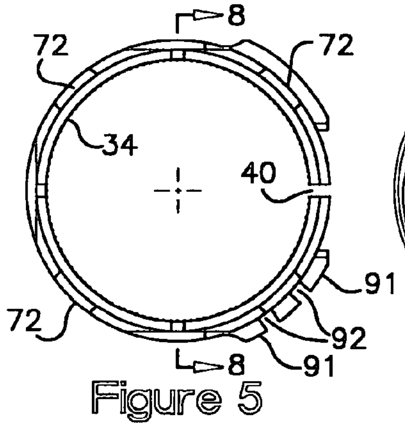
FIG. 5 is a top plan view of the ring blade housing of FIG. 3.
Figure 6:
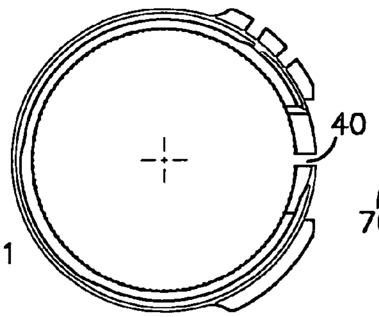
FIG. 6 is a bottom plan view of the ring blade housing of FIG. 3.
Figure 7:
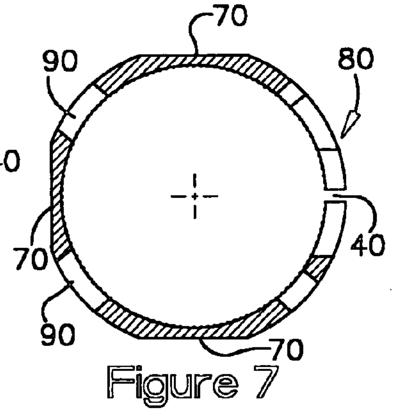
FIG. 7 is a section view as seen from the plane defined by the line 7—7 of FIG. 4.

The rotary knife depicted in FIG. 1 has a handle 20 that is manipulated by a user and a blade housing 30 that supports the ring bade 12. The blade housing 30 has a housing body 32 having a wall 34 (FIG. 3) that defines a housing interior 36 into which material separated by the cutting surface 14 of the ring blade 12 moves as it is cut. The blade housing body 32 includes a bearing surface (described in more detail below) that is defined by the wall 34 and which supports the ring blade 12 while allowing the ring blade to rotate with respect to the blade housing.

A notch 40 in the body wall 34 allows the bearing surface to be expanded outwardly for separating the ring blade 12 from the blade housing 30. Should the ring blade need to be sharpened or replaced, the bearing surface is expanded and the ring blade slips out of the housing through an expanded or widened opening 42 in one end of the blade housing 30.

At an end of the blade housing 30 spaced from the bearing surface, the housing body defines a coupling portion 50 for coupling the housing to a suction tube 52 that withdraws material from the blade housing interior away from the ring blade 12. Alternate exemplary embodiments of the coupling portion of the blade housing are described in detail below.

Figure 11:
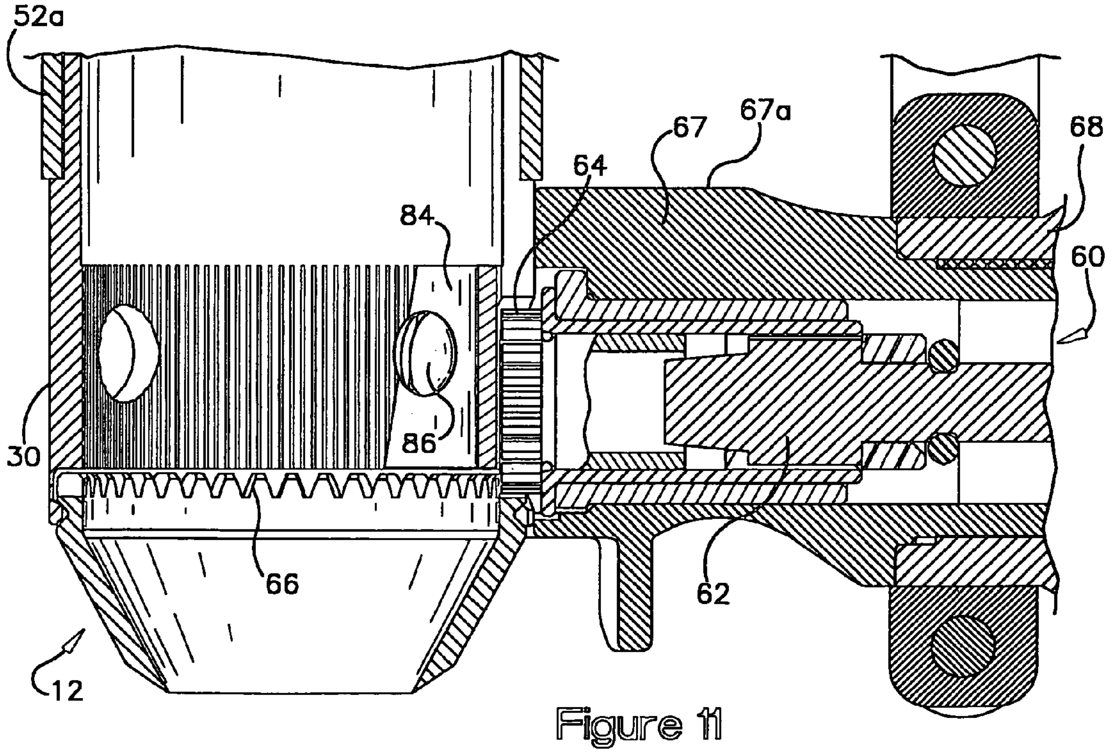
FIG. 11 is an enlarged section view of the rotary knife of FIG. 1 that illustrates an engagement between a knife handle, a blade, and a blade housing.

FIG. 11 illustrates the blade housing 30 attached to the handle. A distal portion of a drive assembly 60 provides motive power to rotate the ring blade. The drive assembly 60 is commercially available as part of a Model Series II rotary knife sold by Bettcher Industries. The drive assembly 60 includes a shaft 62 coupled to a gear 64 that engages with teeth 66 of the ring blade. A user actuated lever 68 extends outwardly from a bottom of the handle 20. When the lever is rotated toward the handle, a valve (not shown) inside the handle routes pressurized air through the handle to rotate the drive shaft 62 and attached gear 64 thereby causing the ring blade 12 to rotate. As seen in FIG. 11 the drive assembly 60 is supported by a handle assembly including a frame member 68 and a head member 67 extending from the frame member to support the blade housing 30.

The embodiment of the invention depicted in FIG. 1 has a rigid suction tube 52 that engages the blade housing at an end removed from bearing surface to create a suction inside the blade housing in the vicinity of the ring blade. The rigid suction tube 52 has a smooth outer surface to accommodate attachment of a vacuum tube at an end of the tube spaced from the blade housing 30. Suction applied by the tube 52 attracts material cut by the blade that enters the housing 30. Typically the knife is used to cut meat so that meat trimmings pass through the tube 52 into a collector or container for the meat. This rigid suction tube 52 is constructed from sheet metal that is bent to form a tube and welded along a seam.

FIGS. 3–8 depict details of an exemplary metal housing 30 constructed in accordance with a first embodiment of the invention. The housing 30 is generally cylindrical in shape that is formed as a metal piece that has been machined appropriately. The housing 30 has interior surfaces defined by the wall 34 that extends from a region of the bearing surface to the coupling portion 50 of the housing 30. An outer surface of the housing between the bearing and the coupling portion 50 has flats 70 machined into the housing to increase the flexibility of the housing. Additionally slots 71 are machined through the wall 34 in the region of the coupling portion 50 to also increase the flexibility of the housing 30. As noted above, the housing is expanded outwardly to allow the blade 12 to be removed from engagement with the housing 30.

The coupling portion 50 has a reduced wall thickness sized to accept the suction tube 52. Four generally equally spaced rectangular shaped pins 72 extend from an outer surface 73 of the wall 34 in a region of the coupling portion 50 of the housing body. These pins 72, in conjunction with slots 74 (FIG. 1) formed in one end 52*a* of the tube 52 define a bayonet mount or engagement between the tube 52 and the housing 30.

Figure 8:
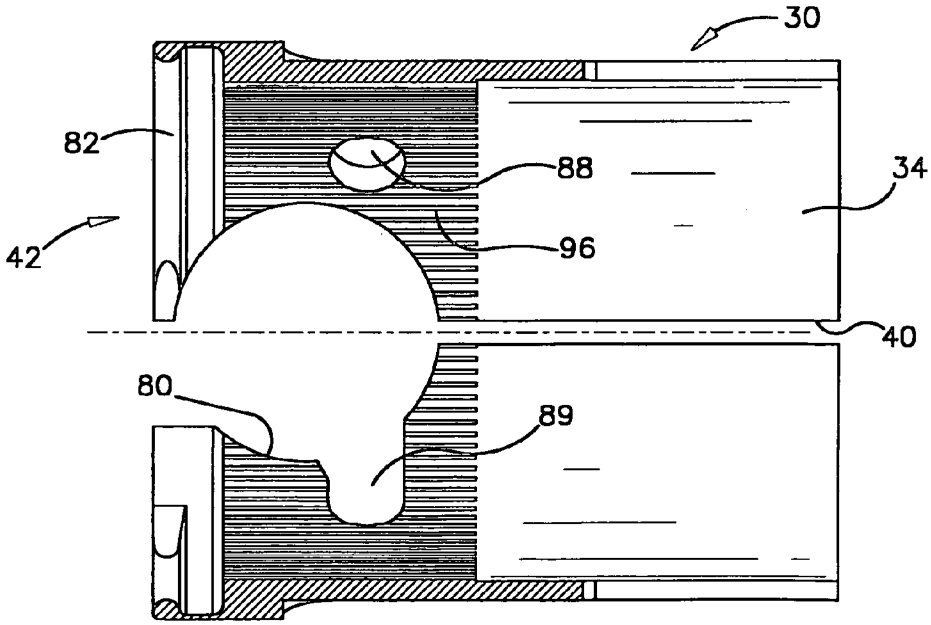
FIG. 8 is a section view as seen from the plane defined by the line 8—8 of FIG. 5.

As best seen in FIG. 8, the wall 34 of the housing 30 includes an opening 80 along its side near a bead 82 that defines a bearing surface for rotatably supporting the ring blade 12. This opening 80 accommodates entry of the gear 64 into the blade housing. During assembly of the knife, the blade housing 30 is attached to the head 67 by means of an arcuate mounting plate 84. The mounting plate 84 is a trapezoidal shaped metal plate that has a bend that conforms generally to a radius of curvature of the blade housing's interior wall surface. The gear extends through the opening in the housing and the plate is connected to the head by two screws 86 that pass through the plate 84 and an appropriately aligned hole 88 and slot 89 in the wall 34 of the blade housing. The screws 86 are tightened by a screwdriver that is inserted into the housing by openings 90 in the wall 34. Once the housing is attached to the head 67, the blade 12 is mounted to the housing. To widen the opening 42 the user tightens the screw 86 which passes through the opening 88 while leaving a second screw which extends through the slot 89 loosely threaded into the head. As seen in the plan view of FIG. 5, the wall 34 has three lands 91 that extend in a line along the side of the housing 30. With the housing attached to the head the user can insert a flat bladed screwdriver or the like into a slot or recess 92 between two adjacent lands 91 and pry the screwdriver blade against the side of the head 67 to enlarge or widen the opening 42 so that the largest diameter part of the ring blade passes through the opening 42. To affix the blade in place, the user releases the flat blade of the screwdriver and the flexed wall 34 returns to its normal shape and the bearing surface of the bead fits into a groove 94 that extends circumferentially around the ring blade in the region of the gear teeth 66. With the blade secured to the housing, the second screw 86 is tightened to securely hold the housing in place.

As best depicted in FIG. 8 an interior of the housing has a knurled surface 96. This surface engages a similarly knurled convex surface of the arcuate plate 84 that covers the opening 80 in the blade housing 30. The frictional engagement between the arcuate plate 84 and the housing is increased due to the presence of these conforming knurled surfaces and this avoids inadvertent loosening of the engagement between the blade and the housing during operation of the knife 10.

Figure 9:
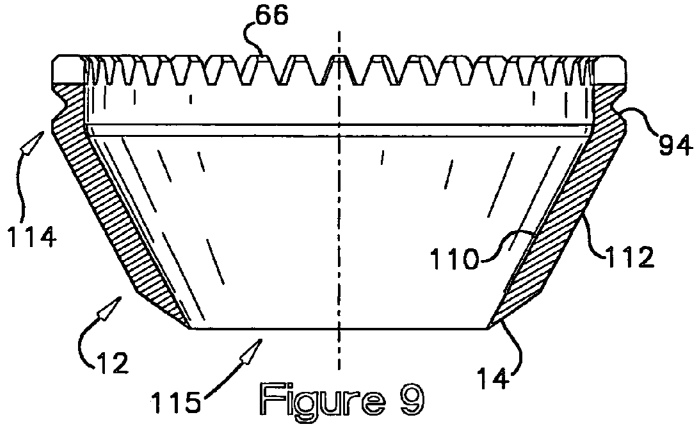
FIG. 9 is a section view of a ring blade for use with the disclosed embodiments of the rotary knife.
Figure 10:
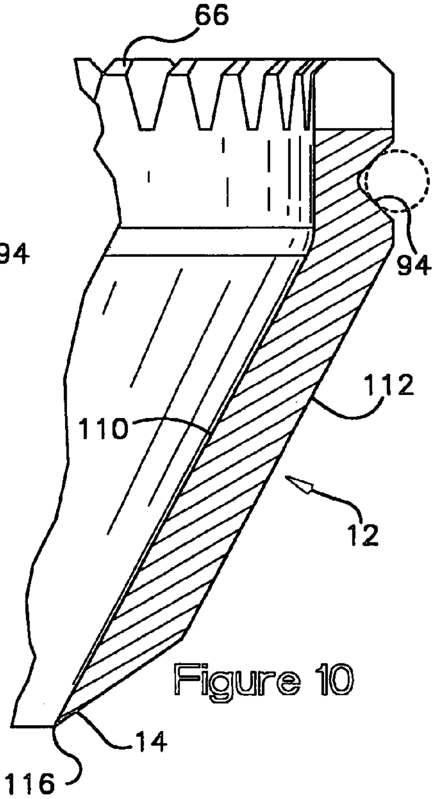
FIG. 10 is an enlarged section view of the ring blade depicted in FIG. 9.

The particular shape of the blade 12 is seen in greater detail in FIGS. 9 and 10. The blade 12 has inner and outer walls 110, 112 that define a blade body of generally uniform thickness in a region between the groove 94 and the cutting surface 14. The blade 12 is most preferably in a form of a frustum that tapers inwardly from a generally cylindrical portion 114 in the region of the gear teeth 66 to a necked down region that has an opening 115 into which material passes as it is cut due to the suction applied to the interior of the blade housing. The cutting surface 14 tapers toward a generally cone shaped inner wall 110. In the region of the gear teeth, the blade 12 the generally cylindrical shaped portion 114 includes the groove 94 in an outer wall that is engaged by the bead 82 and a short cylindrical inner wall that is disrupted about its diameter by the gear teeth 66. In the exemplary embodiment, the frustum shaped ring blade defines an opening having a diameter of approximately ¾ inches in the region of the cutting surface into which the meat trimmings flow and a diameter of approximately 1¼ inches in the region of the gear teeth 66. In this embodiment, the height of the blade from the tip of the gear teeth to an edge 116 of the cutting surface 14 is approximately 0.67 inches. As noted above, the blade housing 30 is generally cylindrical in shape and has a inner diameter approximately the same as the inner diameter of the gear teeth of the blade. The height of the housing 30 in this exemplary embodiment is about 1.7 inches and extends above an upper surface 67*a* of the head 67 of the handle assembly. These dimensions are for use with one application and other applications may use other appropriately adjusted dimensions.

With the housing 30 attached to the head 67 the user attaches the tube 52 to the blade housing by slipping the end of the tube having the notches 74 over the over the end of the housing with an entry portion 74*a* of the notches aligned with the pins 72. The tube slips down over the end of the generally cylindrical housing portion 50 until the pins abut a side 74*b* of the notch 74. The engagement between tube and housing is locked in place by rotating the tube in a clockwise direction to the orientation shown in FIG. 1.

Attached to the side of the tube 74 is a bracket 120 that extends downwardly away from the tube along a side of the handle 20 when the tube 52 has been rotated to the position shown in FIG. 1. A U shaped collar 122 fits over a cylindrical part of the frame 68 and is attached to the bracket 120 by means of threaded connectors that extend through openings in the bracket and engage corresponding threaded openings in exposed end portions of the U shaped collar 122. The collar 122 thereby secures attachment of the tube 52 to the housing 30 and also acts as a guard or shield that impedes movement of the users hand toward the distal end of the handle 20

Alternate Embodiment

Figure 12:
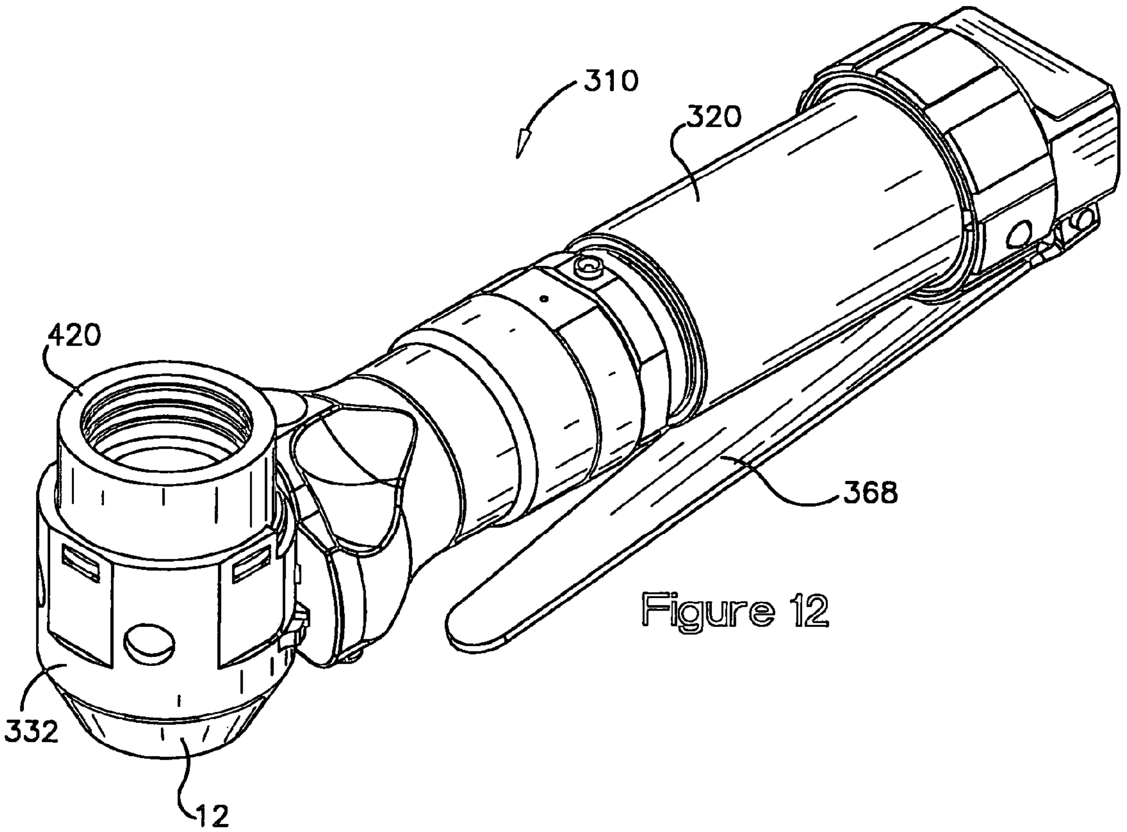
FIG. 12 is a perspective view of a rotary cutting knife constructed in accordance with an alternate exemplary embodiment of the invention.
Figure 13:
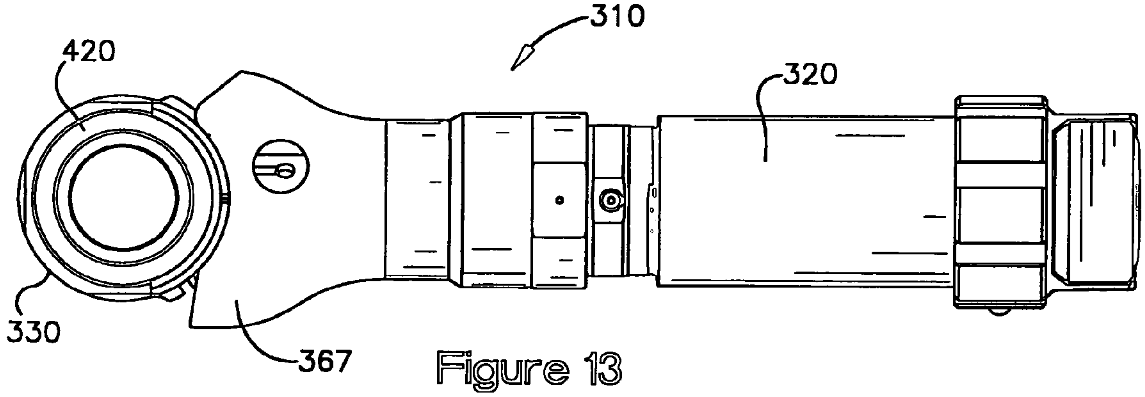
FIG. 13 is a top plan view of the FIG. 12 rotary cutting knife.

FIGS. 12 and 13 depict a rotary knife 310 that includes the same style ring blade 12 depicted in FIG. 9 that defines a closed loop cutting surface 14 for cutting material which the ring blade contacts during rotation of the ring blade 12.

The embodiment of the invention depicted in FIG. 12 engages a flexible suction tube 352 (FIG. 20) that engages the blade housing at an end removed from the bearing surface that supports the blade 12. The suction tube 352 creates a suction region inside a blade housing 330 in the vicinity of the ring blade that attract material that is cut during operation of the rotary knife.

Figure 14:
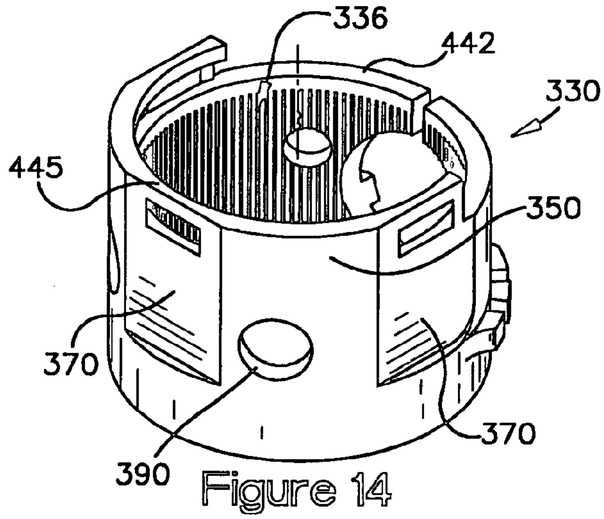
FIG. 14 is a perspective view of an alternate embodiment of a ring blade housing constructed in accordance with the invention.
Figure 15:
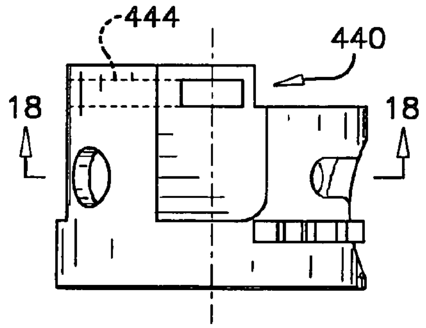
FIG. 15 is a side elevation view of the FIG. 14 ring blade housing.

The rotary knife depicted in FIG. 12 has a handle 320 that is manipulated by a user. The blade housing 330 has a housing body 332 having a wall 334 (FIG. 14) that defines a housing interior 336 into which material separated by the cutting surface 14 of the ring blade 12 moves as it is cut. The blade housing body 332 includes a bearing surface that is defined by the wall 334. The bearing surface supports the ring blade 12 while allowing the ring blade to rotate with respect to the blade housing 330.

A notch 340 in the body wall 334 allows the bearing surface to be expanded outwardly for separating the ring blade 12 from the blade housing 330. Should the ring blade need to be sharpened or replaced the bearing surface is expanded and the ring blade slips out of the housing through an expanded opening 342 in one end of the blade housing 330.

At an end of the blade housing 330 spaced from the bearing surface, the housing body defines a coupling portion 350 for coupling the housing to the flexible suction tube 352 that withdraws material from the blade housing interior away from the blade housing.

Figure 20:
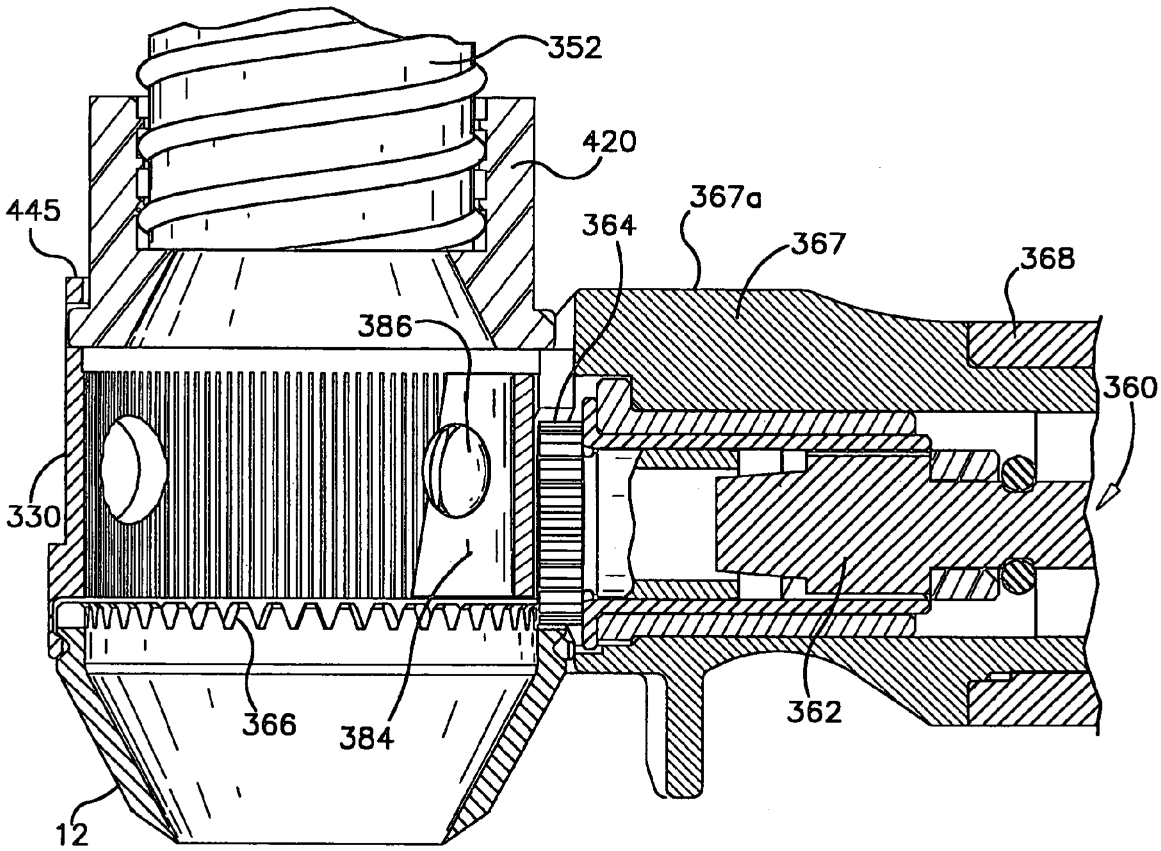
FIG. 20 is an enlarged section view of the rotary knife of FIG. 12 that illustrates an engagement between a knife handle, a blade, and blade housing.

FIG. 20 illustrates the blade housing 330 attached to the handle. A distal portion of a drive assembly 360 for providing motive power to rotate the ring blade is depicted. The drive assembly 360 is commercially available in a Model Series II rotary knife sold by Bettcher Industries. The drive assembly 360 includes a shaft 362 coupled to a gear 364 that engages with teeth 366 of the ring blade. A user actuated lever 368 extends outwardly from a bottom of the handle 320. When the lever is rotated toward the handle, a valve (not shown) inside the handle routes air to rotate the drive shaft and attached gear 364 thereby causing the ring blade to rotate.

As seen in FIG. 20 the handle is made up of a handle assembly including a frame member 368 and a head member 367 extending from the frame member to support the blade housing 330.

Figure 23:
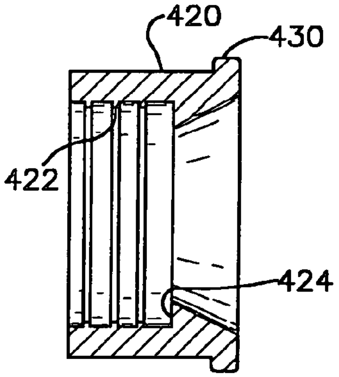
FIG. 23 is a section view of the FIG. 21 fitting as seen from the plane defined by the line 23—23 in FIG. 22.

The embodiment of the invention depicted in FIG. 20 has a flexible suction tube 352 that engages the blade housing by means of a coupling 420. The suction tube 352 has a threaded outer surface that can be attached to the coupling 420 by threading one end of the suction tube 352 into the coupling 420. An annular recess has a threaded interior surface 422 (FIG. 23) for attaching the tube 352. The tube 352 is threaded into the coupling 420 until an end of the tube abuts a lip 424 in the coupling at the base of the coupling's annular interior. Suction applied by the tube 352 attracts material cut by the blade that enters the housing 330. Typically the knife is used to cut meat so that meat trimmings pass through the tube 352 into a collector or container for the meat. The flexible tube 352 is constructed from plastic and has a smooth interior surface to allow unimpeded movement of meat from the housing to the meat container.

FIGS. 14–19 depict details of an exemplary metal housing 330 constructed in accordance with the alternate embodiment of the invention. The housing 330 is generally cylindrical in shape that is formed as a metal piece that has been machined appropriately. The housing 330 has interior surfaces defined by the wall 334 that extends from a region of the bearing surface to the coupling portion 350 of the housing 330. An outer surface of the housing between the bearing and the coupling portion 350 has flats 370 machined into the housing to increase the flexibility of the housing. As noted above, the housing is expanded outwardly to allow the blade 12 to be removed from engagement with the housing 330.

Figure 19:
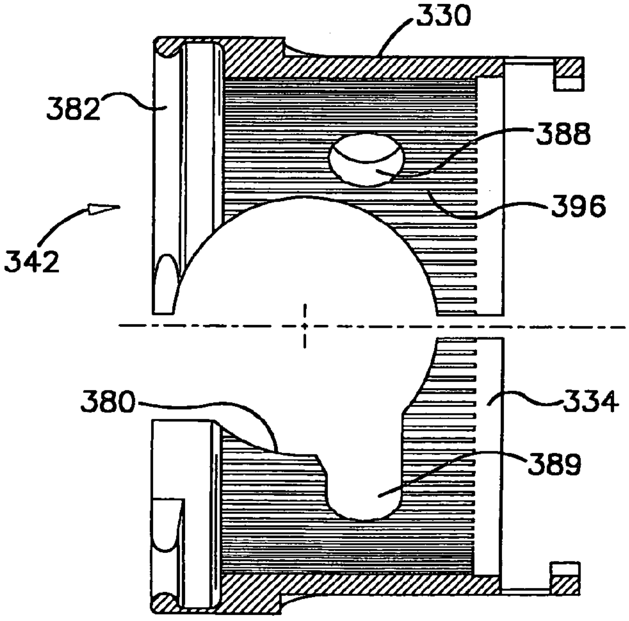
FIG. 19 is a section view as seen from the plane defined by the line 19—19 of FIG. 16.

As best seen in FIG. 19, the wall 334 of the housing 330 includes an opening 380 along its side near a bead 382 that defines a bearing surface for rotatably supporting the ring blade 12. This opening 380 accommodates entry of the gear 364 into the blade housing. During assembly of the knife, the blade housing 330 is attached to the head 367 by means of an arcuate mounting plate 384. The gear 364 extends through the opening 380 in the housing and the plate 384 is connected to the head by two screws 386 (only one or which is visible in FIG. 20) that pass through an opening in the plate 384 and an appropriately aligned hole 388 and slot 389 in the wall 334 of the blade housing. The screws 386 are tightened by a screwdriver whose blade is inserted into the housing by openings 390 in the wall 334. Once the housing is attached to the head 367, the blade 12 is mounted to the housing. To widen the opening 342 the user tightens the screw 386 which passes through the opening 388 while leaving a second screw which extends through the slot 389 loosely threaded into the head. As seen in the plan view of FIG. 16, the wall 334 has three lands 391 that extend outwardly in a line from an outer surface of the side of the housing 30. With the housing attached to the head the user can insert a flat bladed screwdriver or the like into a slot or recess 392 between two adjacent lands 391 and pry the screwdriver blade against the side of the head 367 to enlarge or widen the opening 342 so that the largest diameter part of the ring blade 12 passes through the opening 342. To affix the blade in place, the user releases the flat blade of the screwdriver and the flexed wall 334 returns to its normal shape and the bearing surface of the bead 382 fits into the groove 94 that extends circumferentially around the ring blade in the region of the gear teeth 366. With the blade secured to the housing, the second screw 386 (not shown) is tightened to securely hold the housing in place.

As best depicted in FIG. 19 an interior of the housing has a knurled surface 396. This surface engages the arcuate plate 384 that covers the opening 380 in the blade housing 330. The presence of the knurled surface increases a frictional engagement between the plate 384 and the housing and this avoids inadvertent loosening of the engagement between the blade and the housing during operation of the knife 310.

Figure 16:
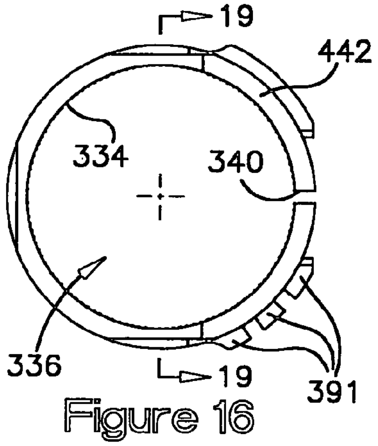
FIG. 16 is a top plan view of the ring blade housing of FIG. 14.
Figure 17:
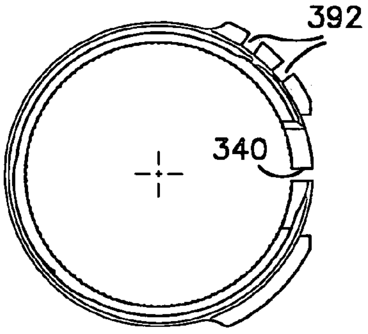
FIG. 17 is a bottom plan view of the ring blade housing of FIG. 14.
Figure 18:
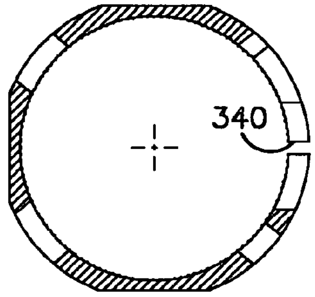
FIG. 18 is a section view as seen from the plane defined by the line 18—18 of FIG. 15.
Figure 21:
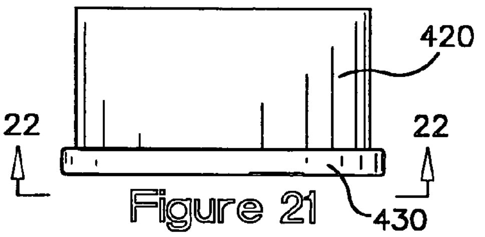
FIG. 21 is an elevation view of a hose fitting that attaches to the blade housing depicted in FIG. 14.
Figure 22:
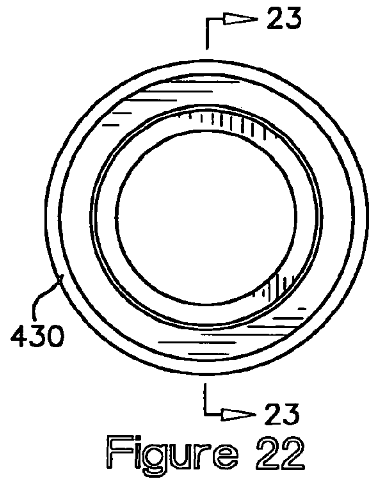
FIG. 22 is a plan view of the fitting as seen from the plane defined by the line 22—22 of FIG. 21.
Figure 24:
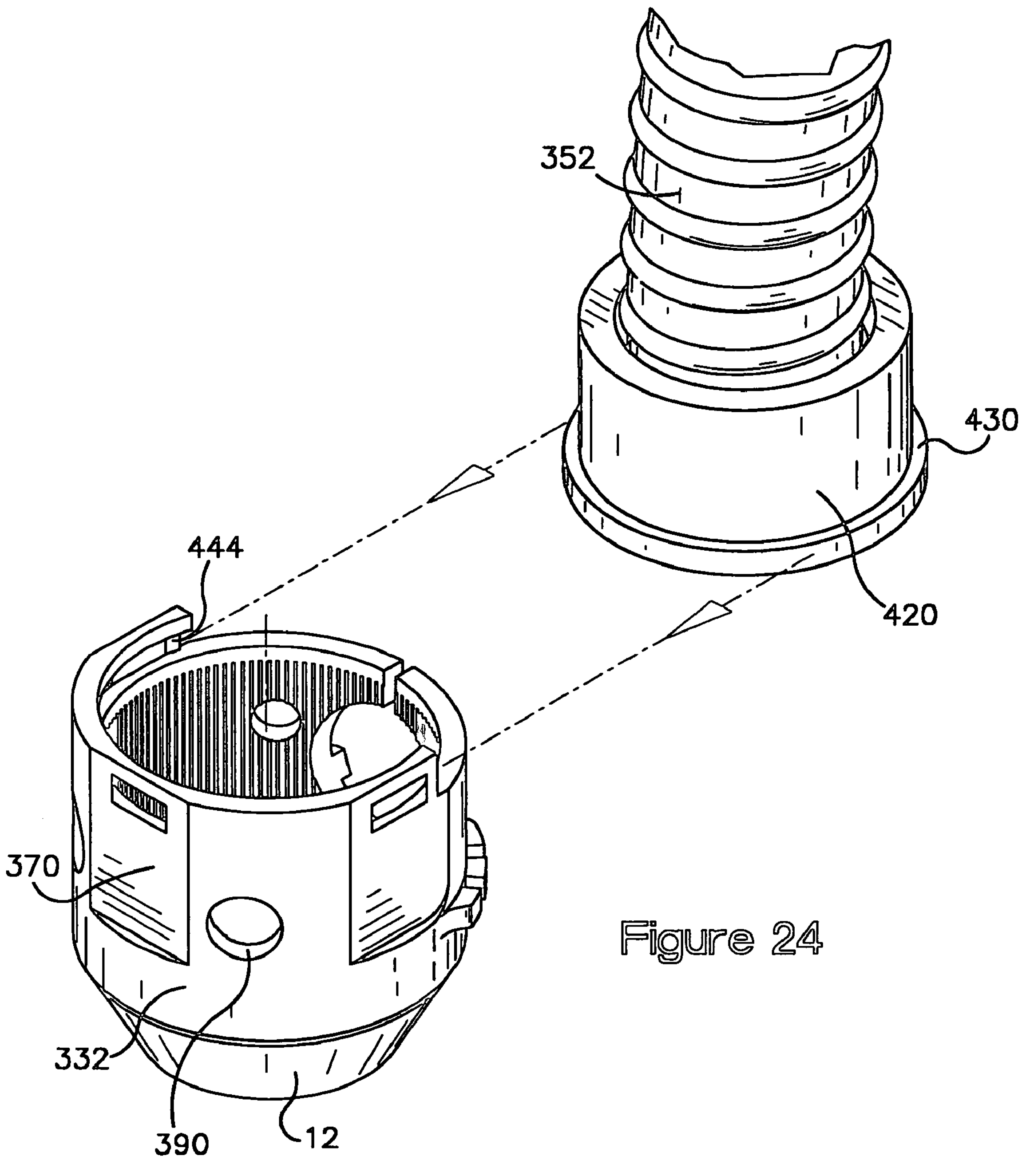
FIG. 24 is a perspective view showing a means of attaching a hose fitting to a blade housing.

As seen in FIG. 21, the coupling 420 has a flange 430 at one end. The coupling is attached to the housing 330 by inserting (See FIG. 24) the flange 430 through a notch 440 in a wall 334 of the housing 330. As seen in FIG. 16, the notch is formed by a reduced height wall portion bounded by a top edge 442. The coupling portion 350 of the housing has a groove 444 around an interior surface of the wall 334 sized to accommodate the flange 430. As the flange is inserted into the coupling portion 350 the flange seats within the groove 444. The housing 330 is generally cylindrical in shape and has a generally cylindrical interior wall surface. The housing supports the same configuration blade that is depicted in FIG. 9. The height of the housing from the region of the bearing to the top of the coupling portion that overlies the flange of the coupling is approximately 1$\frac{1}{16}$ inches. As seen by reference to the depictions in FIGS. 11 and 20, in one embodiment (FIG. 11) a top surface of the housing 30 extends above the top surface 67*a* of the handle's head 67 and in the embodiment depicted in FIG. 20, a top surface 445 that overlies the coupling flange is approximately coplanar with the top surface 367*a* of the handle's head 367.

While alternate exemplary embodiments of the invention have been described with a degree of particularity, it is the intent that the invention include all alterations and modifications from the alternate embodiments falling within the spirit or scope of the appended claims.

What is claimed is:

1. A method for operating a rotary knife having a handle and a drive system supported by the handle comprising:

a) providing a blade housing having a blade housing body that defines a generally cylindrical interior, the blade housing body defining a bearing surface for rotatably supporting a ring blade and a coupling portion spaced from the bearing surface for attachment of a suction tube, the blade housing body including a notch permitting the bearing surface to be expanded for insertion/removal of the ring blade from the blade housing;

b) expanding the bearing surface of the blade housing body, inserting the ring blade into the blade housing body and rotatably supporting the ring blade on the bearing surface of the blade housing body, the ring blade comprising a closed loop cutting surface for cutting material and gear teeth for rotating the ring blade, the bearing surface of the blade housing body sized to engage a surface of the ring blade with the gear teeth of the ring blade engaged with the drive system;

c) attaching a suction tube to the coupling portion of the blade housing body; and d) rotating the ring blade and applying suction to the suction tube to move meat cut by the ring blade through the generally cylindrical interior of the blade housing body and into the suction tube as a user manipulates the knife.

2. A method for operating a rotary knife having a handle and a drive system supported by the handle comprising:

a) connecting a blade housing having a blade housing body that defines a generally cylindrical interior to the handle by attaching a support plate having a curvature that matches a generally cylindrical interior surface of the blade housing to a handle head;

b) rotatably supporting a generally frustum shaped ring blade comprising a closed loop cutting surface for cutting material and gear teeth for rotating the ring blade to a bearing surface of the housing body sized to engage a surface of the frustum shaped ring blade with the gear teeth engaged with the drive system;

c) attaching a suction tube to a coupling body wall portion of the housing body spaced from the ring blade; and d) rotating the ring blade and applying suction to the suction tube to move meat cut by the ring blade through the generally cylindrical interior of the blade housing body and into the suction tube as a user manipulates the knife.

3. The method of claim 2 wherein the drive includes a gear having gear teeth that mesh with the gear teeth of the ring blade and wherein the step of attaching the support plate separates gear teeth of the drive from a blade housing interior.

4. The method of claim 1 wherein the coupling portion of the blade housing body includes a plurality of pins extending from an outer surface of the coupling portion which engage a plurality of slots formed in an end of the suction tube to attach the section tube to the blade housing body.

5. The method of claim 1 wherein the coupling portion of the blade housing body includes a groove in an interior surface of the coupling portion which engages a flange formed in an end of the suction tube to attach the suction tube to the blade housing body.

6. The method of claim 1 wherein the blade housing body includes a plurality of outwardly extending lands on an outer surface of the body, the plurality of lands defining one or more recesses adapted to receive a pry blade used to pry the blade housing body and expand the bearing surface.

7. The method of claim 1 wherein the blade housing body includes a drive gear opening, the drive gear opening of the wall providing access for a drive gear of the drive system to engage the gear teeth of the ring blade.

8. The method of claim 1 wherein the coupling portion of the blade housing body having a height that reaches a plane of a topmost surface of the handle.

* * * * *